(12) United States Patent
Petkovski

(10) Patent No.: US 11,148,572 B2
(45) Date of Patent: Oct. 19, 2021

(54) DROP DOWN SLEEPER CABIN

(71) Applicant: Cane Petkovski, Toronto (CA)

(72) Inventor: Cane Petkovski, Toronto (CA)

( * ) Notice: Subject to any disclaimer, the term of this patent is extended or adjusted under 35 U.S.C. 154(b) by 116 days.

(21) Appl. No.: 15/969,709

(22) Filed: May 2, 2018

(65) Prior Publication Data

US 2018/0319307 A1  Nov. 8, 2018

Related U.S. Application Data

(60) Provisional application No. 62/500,442, filed on May 2, 2017.

(51) Int. Cl.
*B60N 3/00* (2006.01)

(52) U.S. Cl.
CPC .................... *B60N 3/008* (2013.01)

(58) Field of Classification Search
CPC .... B60N 5/008; B60P 3/38; B60P 3/39; B60P 3/36; A47C 17/80; A47C 17/84
See application file for complete search history.

(56) References Cited

U.S. PATENT DOCUMENTS

| | | | | |
|---|---|---|---|---|
| 1,544,505 | A * | 6/1925 | Tope | A47C 17/80 5/118 |
| 1,945,875 | A * | 2/1934 | Woller | A47C 17/84 5/10.2 |
| 2,601,684 | A * | 7/1952 | Martin | B60N 3/008 5/119 |
| 4,837,877 | A * | 6/1989 | Hamada | A47C 17/84 5/10.2 |
| 5,690,355 | A * | 11/1997 | Kleinberg | B60P 3/38 105/316 |
| 5,984,404 | A * | 11/1999 | Novoa | A47C 17/84 296/190.01 |
| 7,703,803 | B2 * | 4/2010 | Ekberg | B60R 21/06 280/749 |
| 2007/0056094 | A1 * | 3/2007 | Brun | A47C 17/80 5/10.2 |
| 2008/0116012 | A1 * | 5/2008 | Ferguson | B60P 3/36 187/213 |
| 2015/0239387 | A1 * | 8/2015 | Marasco | B60P 3/39 296/156 |

FOREIGN PATENT DOCUMENTS

| | | | | |
|---|---|---|---|---|
| EP | 3006264 A1 * | 4/2016 | | B60P 3/39 |
| WO | WO-2006131634 A2 * | 12/2006 | | A47C 17/80 |
| WO | WO-2011126428 A1 * | 10/2011 | | B62D 33/0612 |

* cited by examiner

*Primary Examiner* — Robert G Santos
*Assistant Examiner* — Alison N Labarge
(74) *Attorney, Agent, or Firm* — Orin Del Vecchio

(57) ABSTRACT

According to an embodiment of the invention, there is provided a drop down sleeper cabin for a motor vehicle, comprising: a sleeping surface, the sleeping section comprising an extendible surface covered with a mattress; and a cover panel, the cover panel having a moveable engagement system to lock the cover panel to the sleeping surface, wherein the sleeping surface is moveable from an upper position engaging the cover panel to a lower position disengaged from the cover pane and wherein the sleeper cabin provides a storage space when in the upper position and a human-sized sleeping area when in the lower position.

10 Claims, 6 Drawing Sheets

DROP DOWN SLEEPER CABIN

FIELD OF THE INVENTION

The present specification relates generally to a sleeper cabin for a motor coach or bus, and in particular to a drop down sleeper cabin for a bus which can provide storage when not in use.

BACKGROUND OF THE INVENTION

Bus and motor coach drivers are required to take mandatory sleep and rest breaks of up to 8 hours on long-haul journeys. Additionally, drivers may find themselves with a short (e.g. 30-90 minute) rest opportunity while waiting for passengers or as part of a schedule change (e.g. early arrival at a station). It would be desirable, in some instances, for the driver to be provided with the ability to sleep on the bus in a proper sleeping area for both short rest breaks as well as for mandated full sleep breaks.

Some efforts have been made to accommodate drivers on existing buses. However, these accommodations generally consist of small compartments located at the rear of the bus. These compartments may present issues for drivers. Notably, these compartments are typically fully enclosed, inhibit the driver's awareness of their surroundings, and possibly creating claustrophobia-like symptoms in those susceptible. Further, being located at the rear of the bus reduces the driver's ability to hear or respond to people at the front of the bus, who may be attempting to contact the driver through the doors (knocking, calling, etc.). Finally, the provision of such a sleeping compartment takes away from the available luggage and storage space on the bus, reducing the incentive to companies to provide a compartment.

Thus, there is a demand for a sleeper compartment for bus drivers which addresses or mitigates some or all of these issues.

Accordingly, there remains a need for improvements in the art.

SUMMARY OF THE INVENTION

In accordance with an aspect of the invention, there is provided a drop down sleeper cabin for a motor coach which can provide storage when not in use.

According to an embodiment of the invention, there is provided a drop down sleeper cabin for a motor vehicle, comprising: a sleeping surface, the sleeping section comprising an extendible surface covered with a mattress; and a cover panel, the cover panel having a moveable engagement system to lock the cover panel to the sleeping surface, wherein the sleeping surface is moveable from an upper position engaging the cover panel to a lower position disengaged from the cover panel and wherein the sleeper cabin provides a storage space when in the upper position and a human-sized sleeping area when in the lower position.

Other aspects and features according to the present application will become apparent to those ordinarily skilled in the art upon review of the following description of embodiments of the invention in conjunction with the accompanying figures.

BRIEF DESCRIPTION OF THE DRAWINGS

Reference will now be made to the accompanying drawings which show, by way of example only, embodiments of the invention, and how they may be carried into effect, and in which.

Like reference numerals indicated like or corresponding elements in the drawings.

DETAILED DESCRIPTION OF THE EMBODIMENTS

The present invention relates to a sleeper cabin for a motor coach or bus, and in particular to a drop down sleeper cabin for a bus which can provide storage when not in use.

Figure 1:
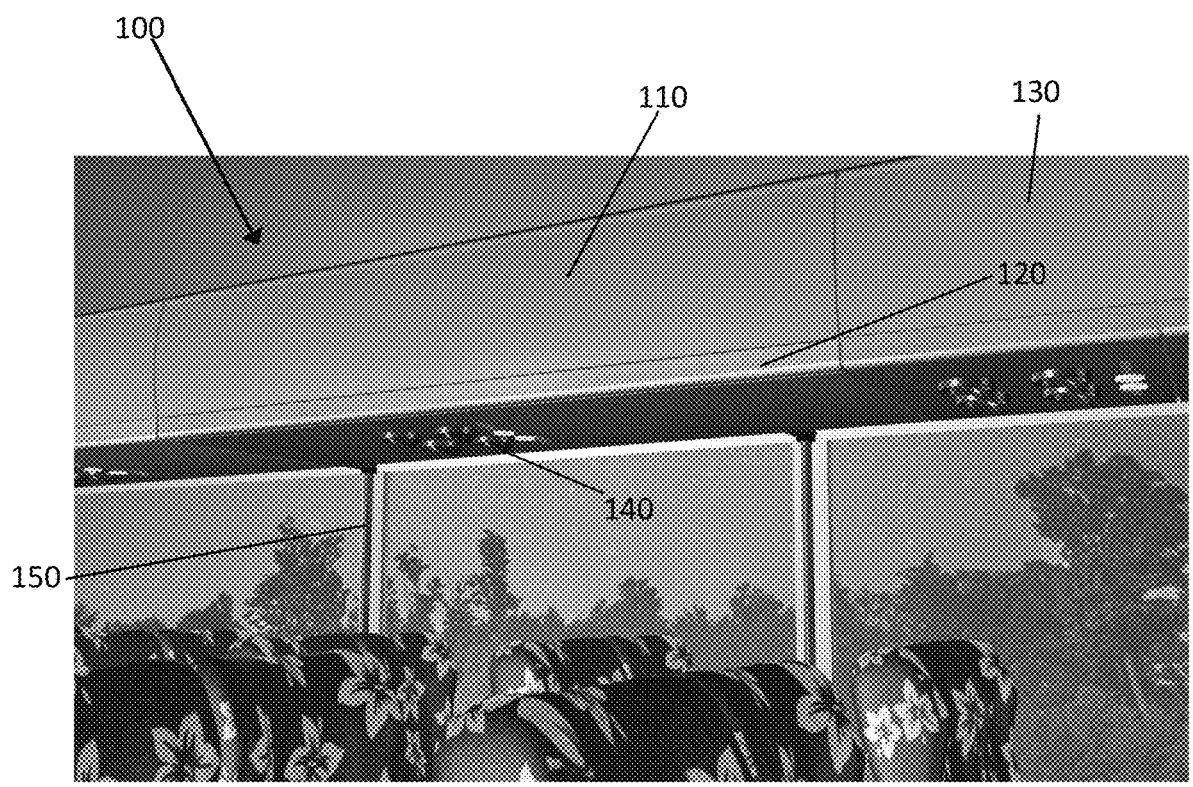
FIG. 1 is a perspective view of a sleeper cabin in a closed position according to an embodiment.

According to an embodiment as shown in FIG. 1, a drop down sleeper cabin 100 may comprise a cover panel 110 and a sleeping surface 120 which engage when closed to resemble and provide storage similarly to adjacent storage compartments 130. The underside of the sleeping surface may include and electronics component 140 containing lights, vents, call buttons and other known features as known on buses and found on the bottom surface of the overhead storage compartments. Sleeping surface 120 is engaged to the exterior wall of the bus via rods 150 that permit sleeping surface 120 to be raised and lowered as required.

Figure 2:
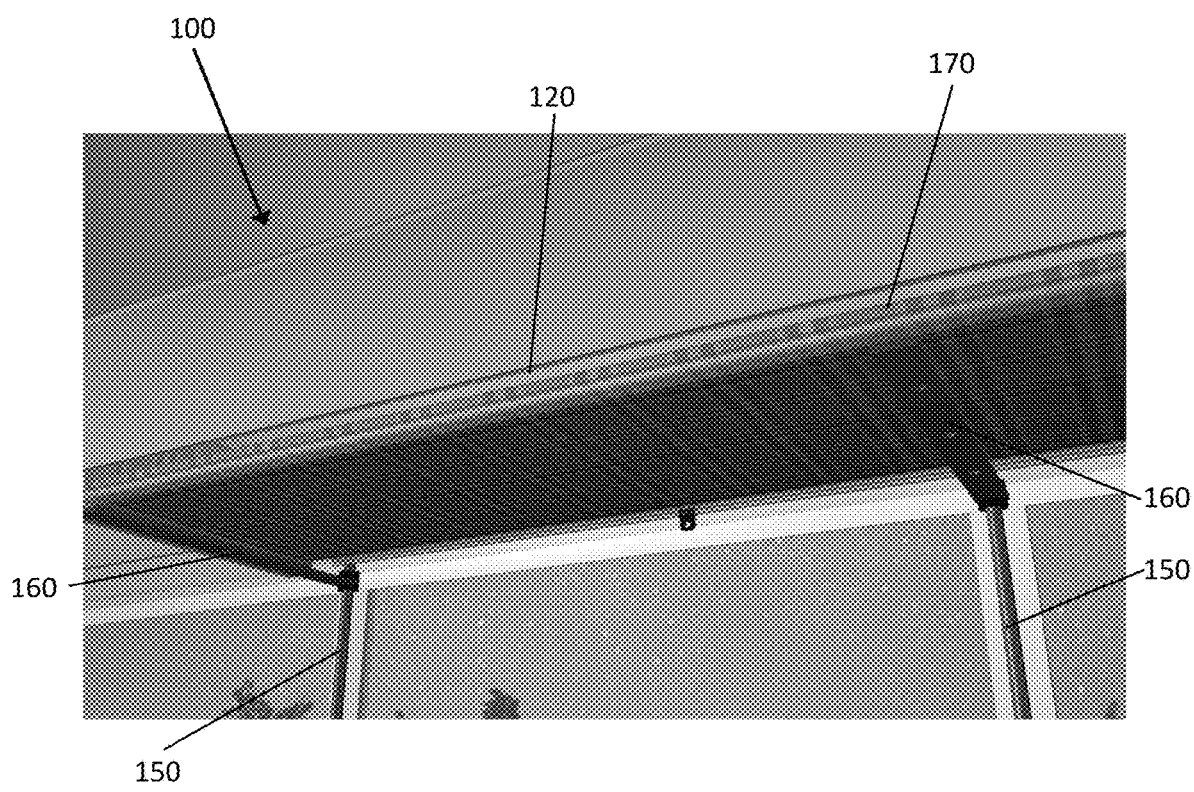
FIG. 2 is a perspective cut-away view of the lower portion of the sleeper cabin of FIG. 1.

As shown by cut-away in FIG. 2, sleeping surface 120 may provide a mattress 170 of high-density foam or a similar material. Flanges 160 are located beneath the mattress 170 and run the width of sleeping surface 120. Flanges 160 engage with rods 150 to support the weight of sleeping surface 120 and enable the sleeping surface 120 to be raised and lowered as needed. Preferably, flanges 160 are concealed by the underside of the sleeper surface and electronics compartment 140, if present.

Figure 3:
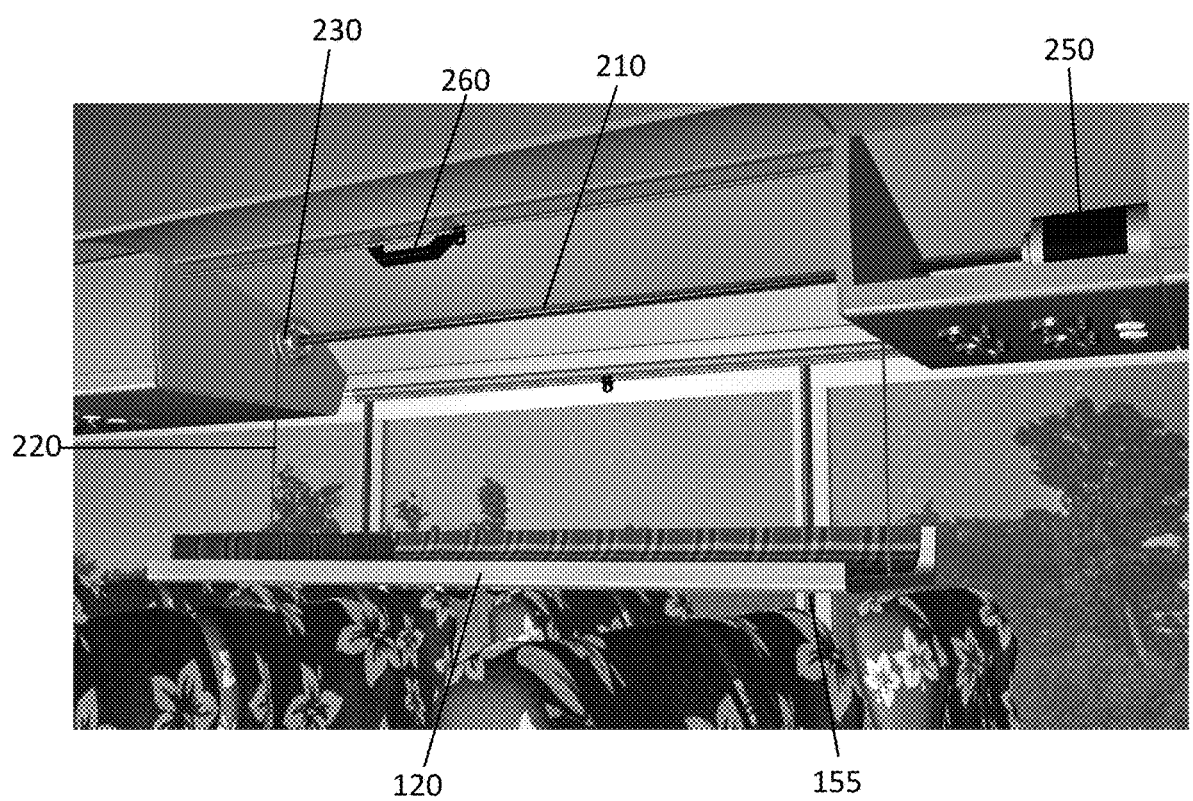
FIG. 3 is a side perspective view of the sleeper cabin of FIG. 1 in an open position.
Figure 4:
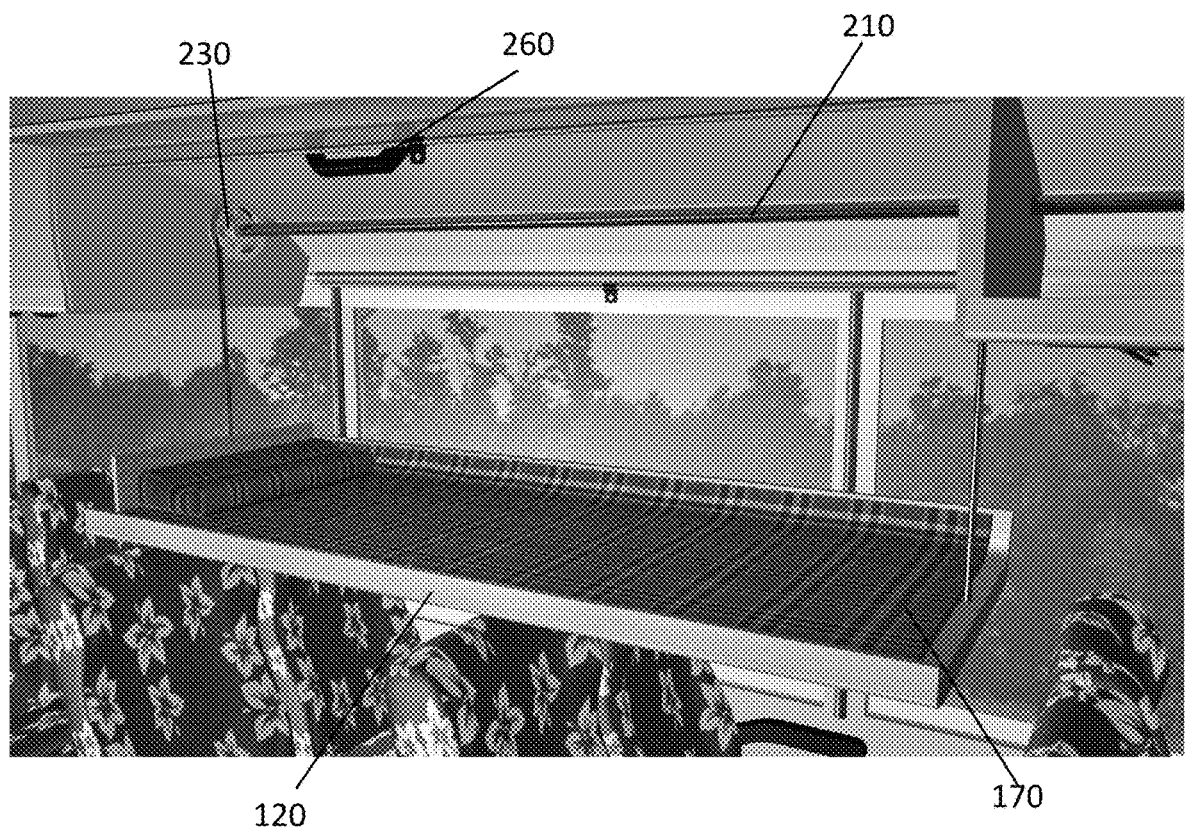
FIG. 4 is a top perspective view of the sleeper cabin of FIG. 3.

FIGS. 3 and 4 show the sleeper cabin 100 with the sleeping surface 120 in a lowered position. Cover panel 110 is raised in a similar manner to the adjacent storage compartments 130. Sleeping surface 120 is connected to a shaft 210 via cables 220 and pulleys 230 which support sleeping surface 120 from the interior roof of the bus. Shaft 210 is connected to a motor 250 which rotates the shaft 210 and pulleys 230 to raise and lower the sleeping surface 120 as needed. As shown, motor 250 is located in an adjacent storage compartment, however, the location may be determined by on the size of the motor and location of the sleeper cabin 100 relative to the bus. It may be seen that when sleeping surface 120 is raised, storage continues to be provided in the remaining space, subject to the requirements for shaft 210 and pulleys 230. The shaft 210 and pulleys 230 may be enclosed or covered to prevent damage when items are stored in the compartment.

In operation, sleeping section 120 is lowered along rails 150 which are secured to or integrated into the window frame. As discussed above, sleeping section 120 is secured to rails 150 by flanges 160. The combination of rails 150 and flanges 160 therefor supports the weight of sleeping section 120 as well as the weight of the user. When lowered, sleeping section 120 may rest on top of one or more seats to provide additional support for the weight. Alternatively, rails 150 may include stoppers 155 as shown in FIG. 3 which arrest the lowering movement of sleeping section 120 at a position above the seats to prevent damage to the seats and headrests.

A ladder or step may also be supplied to assist the user in climbing on and off the sleeping surface 120 when lowered. If space permits, a ladder may be stored within sleeper cabin 100 or attached to the seats. A handle 260 may be integrated into the top of the compartment above cover panel 110 to provide additional assistance in entering and exiting the sleeper cabin 100.

Figure 5:
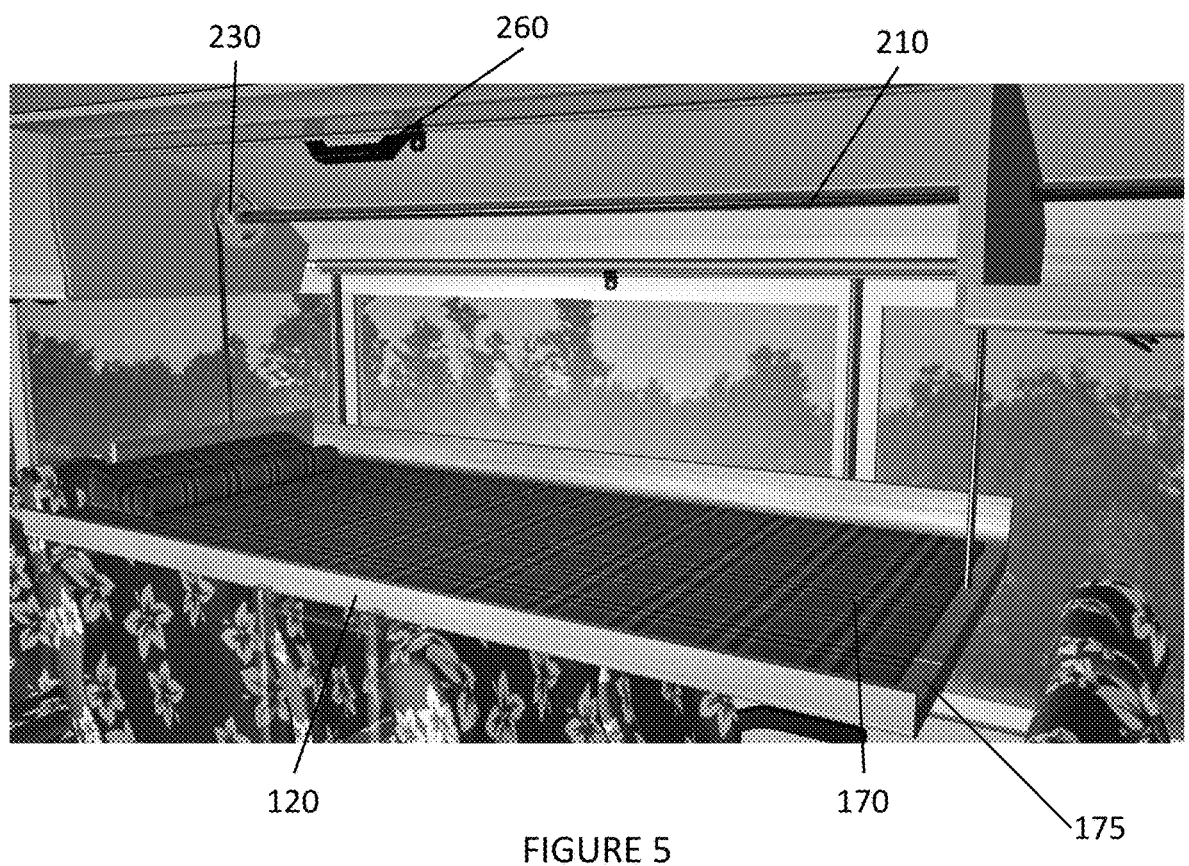
FIG. 5 is a top perspective view the sleeper cabin of FIG. 4.

A further embodiment of sleeper cabin 100 is shown in further detail in FIG. 5. In the displayed embodiment, sleeping surface 120 includes a slidable extension 175 which may be extended once sleeping surface 120 is lower to provide additional width for the user. Accordingly, mattress 170 may also be sized to the width of the sleeping surface with the extension engaged, with the mattress being slidable such that the excess width of mattress rest against the rear of the sleeper cabin 100 when the extension is retracted.

A lowered sleeper cabin is shown in FIG. 4. In the displayed embodiment, headrests 165 of seats 160 may be folded forward to provide additional space for sleeping surface 110 and to reduce to height required for the user to climb on to sleeping surface 110 when lowered. Alternatively, where the headrest 165 may not be folded forward, then sleeping surface 110 may remain above the top of the headrests 165. Where the design and structure of seats 160 and headrests 165 allow it, sleeping surface 110 may be lowered directly on to the headrests 165.

Figure 6:
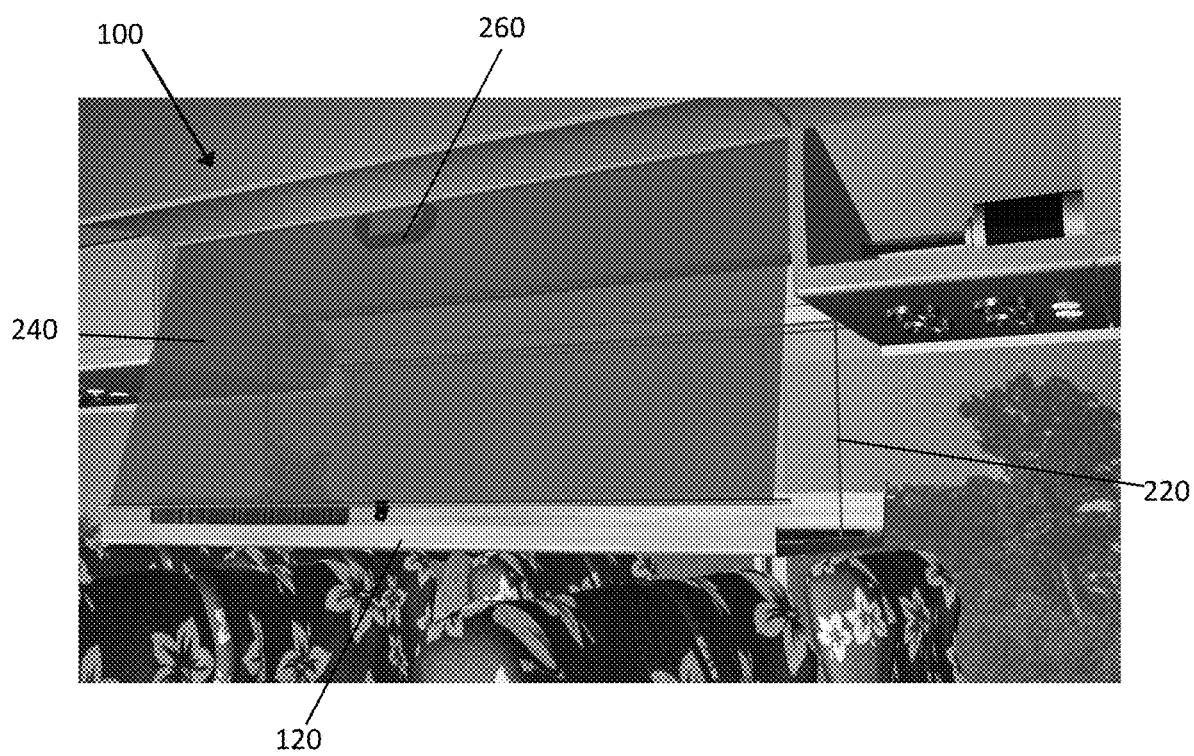
FIG. 6 is a side perspective view of the sleeper cabin of FIG. 5.

A further embodiment of sleeper cabin 100 is shown in FIG. 6. The cover panel 110 may include a retractable curtain 240 while may be pulled down and locked to sleeping surface 120 to provide privacy for the user while sleeping. As shown in FIG. 6, a second curtain may also be provided on the window side for additional privacy.

FIG. 6 shows the lower section 110 of sleeper cabin 100 resting on seats 160 and headrests 165. In this embodiment, the headrest 165 provide enough support that the ladder is not required, and seats 160 may be used for entrance to and egress from sleeping compartment 100.

As discussed above, sleeper cabin 100 may be raised and lowered using motor 250 coupled to shaft 210 and pulleys 230. However, other methods of securing sleeper cabin 100 may be used, such as rails, or adjustable brackets. A motorized system may be of greater benefit to the driver by reducing the effort and time required to set up and take down sleeper cabin 100 to a few minutes or less.

The sleeper cabin 100 is preferably dimensioned similarly to existing ceiling storage compartments. Thus, an overall length of 100 inches, with a sleeping section 120 of 80 inches. The sleeping section 120 and mattress 170 may be extended up to 24 inches in width. The distance sleeping section 120 is required to be lowered is anywhere from 20 to 26 inches, depending on the roof height and seat height, which may require a ladder, if provided, of 30 to 42 inches, depending on the seat height. The sleeper cabin 100 may be incorporated into existing buses with suitable modification of the existing luggage storage at the front rows.

The sleeper cabin 100 may be located at or near the front of bus, allowing the driver to hear and attend to persons at the door of the bus, while maintaining their privacy while resting. Additionally, as described herein, sleeper cabin 100 is intended for used when the bus is parked and stationary, and not while the bus is in motion.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description and all changes which come within the meaning and range of equivalency of the claims are therefore intended to be embraced therein.

What is claimed is:

1. A drop down sleeper cabin for a motor vehicle, comprising:
    a sleeping surface, the sleeping surface comprising an extendible surface covered with a mattress; and
    a cover panel, the cover panel oriented generally perpendicular to the sleeping surface when closed and having a moveable engagement system to lock the cover panel to the sleeping surface, a cable and pulley mechanism operative to move the sleeping surface, with the cable and pulley mechanism comprising a shaft, the shaft oriented along a longitudinal centerline of the sleeping surface, and a pair of pulleys, each pulley attached to a cable secured at opposite ends of the longitudinal centerline of the sleeping surface;
    wherein the sleeping surface is moveable from an upper non-sleeping position engaging the cover panel to a lower sleeping position disengaged from the cover panel with the sleeping surface maintaining a generally level position in both the upper and lower position and throughout movement therebetween, and wherein the sleeper cabin provides an accessible storage space when in the upper position and a human-sized sleeping area when in the lower position, wherein the storage space is accessible via opening of the cover panel without moving the sleeping surface to the lower position.

2. The sleeper cabin of claim 1, wherein the sleeping surface is lowered to a position wherein the sleeping surface is in contact with one or more seats located below the sleeper cabin.

3. The sleeper cabin of claim 1, wherein the sleeping surface is moveably engaged with an exterior side of the motor vehicle by at least two rails, the rails coupled to the sleeping surface by respective flanges.

4. The sleeper cabin of claim 1, wherein the sleeping surface further include an electronics compartment on the underside of the sleeping surface, the electronics compartment including one or more of: lights, vents, fans and call buttons.

5. The sleeper cabin of claim 3, wherein the rails each further include one or more stoppers, the stoppers positioned to stop vertical movement of the sleeping surface at a predetermined position.

6. The sleeper cabin of claim 5, wherein the predetermined position is above the height of any seats located below the sleeper cabin.

7. The sleeper cabin of claim 1, wherein the sleeping surface further includes a moveable extension operative to increase the width of the sleeping surface once lowered.

8. The sleeper cabin of claim 7, wherein the mattress is sized to the width of the sleeping surface with the extension in an extended position.

9. The sleeper cabin of claim 1, wherein the rotatable shaft is coupled to a motor operative to provide motorized movement of the sleeping surface.

10. The sleeper cabin of claim 1, further include one or more retractable curtains, the retractable curtains lockably engageable with the sleeping surface when lowered to enclose the sleeper cabin.

* * * * *